July 6, 1937.  C. SMITH  2,086,445
FOOT OPERATED VEHICLE
Filed July 1, 1936  2 Sheets-Sheet 1
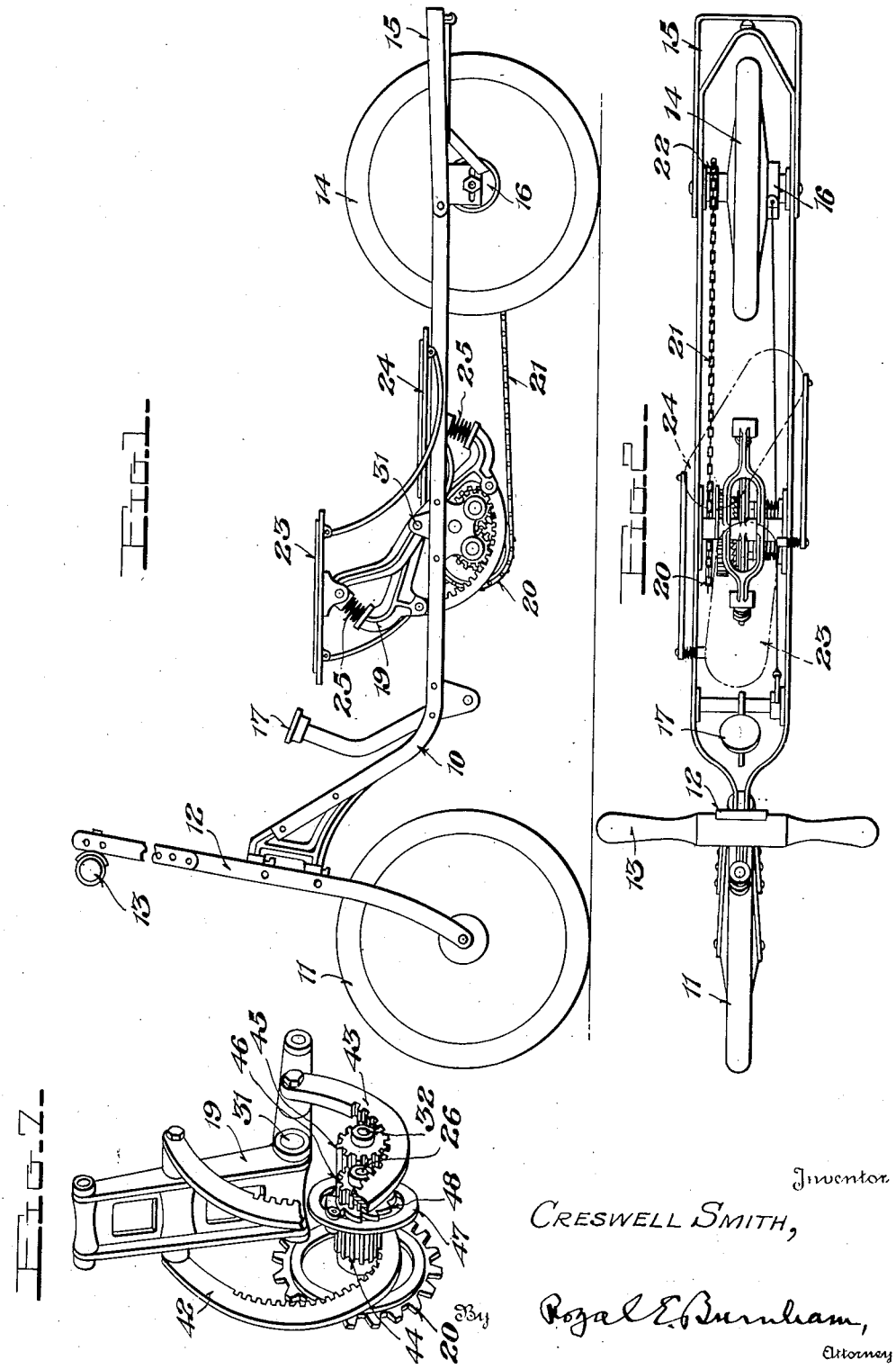
Inventor
CRESWELL SMITH,
By Royal E. Burnham,
Attorney

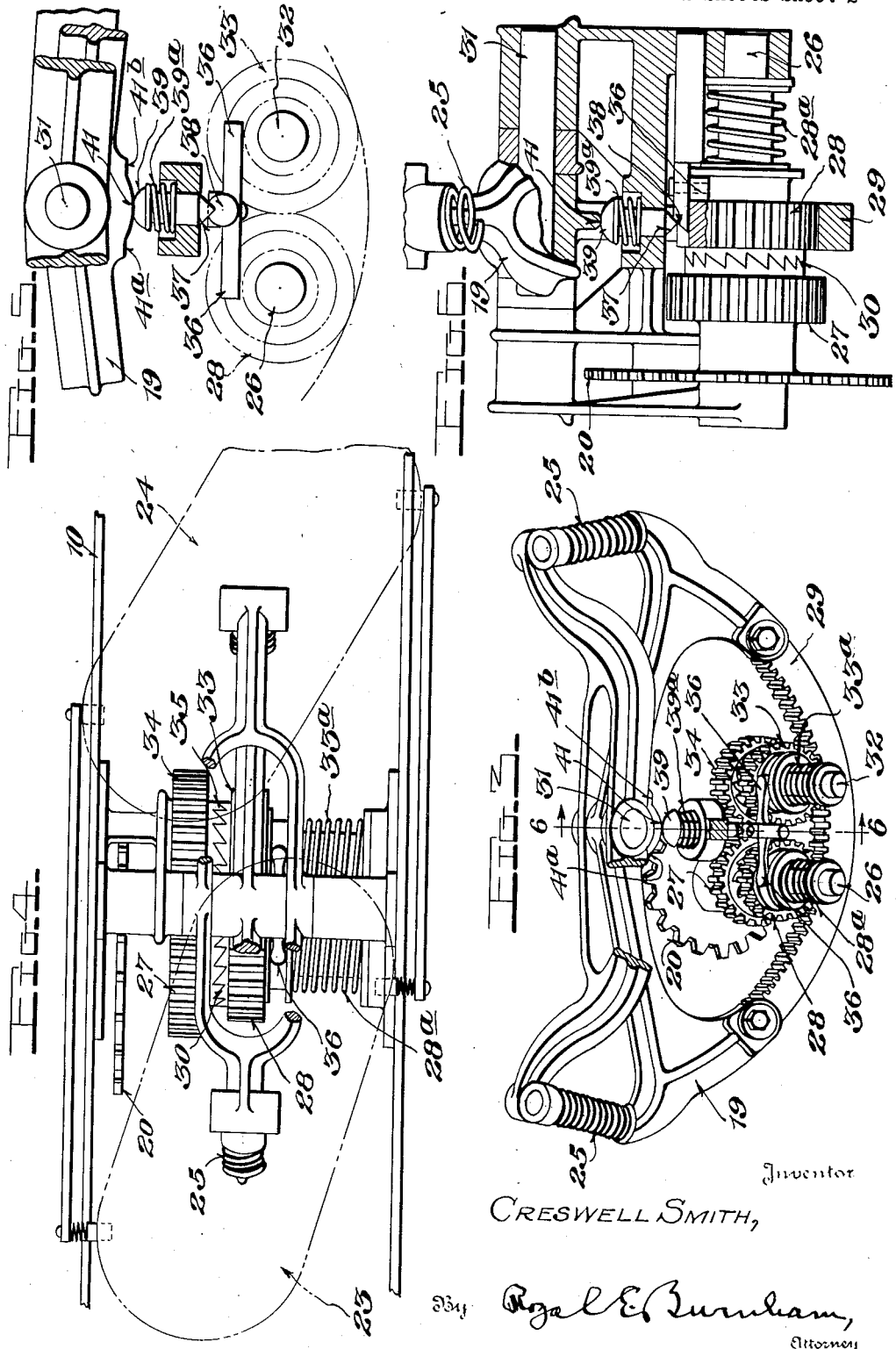

Patented July 6, 1937

2,086,445

UNITED STATES PATENT OFFICE 2,086,445

FOOT OPERATED VEHICLE

Creswell Smith, Sydney, New South Wales, Australia

Application July 1, 1936, Serial No. 88,477
In Australia November 28, 1935

11 Claims. (Cl. 208—37)

This invention relates to seatless foot-propelled vehicles having a front steering ground wheel and a rear driving ground wheel and comprises means whereby downward travel only of a vertically oscillating member pivoted on a framing of the vehicle is adapted to effect forward travel of the vehicle, and includes means for freewheeling the vehicle.

The invention differs from known forms of bicycles and tricycles in that the foot-operated oscillating member does not rotate but oscillates in a vertical plane, that downward travel only of the ends of this member effects forward drive of the vehicle, and the return upward movements of the ends of the oscillating member have no propelling and no braking action on the vehicle.

In the accompanying drawings which illustrate two forms of the invention:—

Fig. 1 is a side elevation of a two wheeled vehicle;

Fig. 2 is a plan of the same;

Fig. 3 is a perspective view of one form of driving mechanism;

Fig. 4 is an enlarged plan view of part of the driving mechanism;

Fig. 5 is a detail view, partly in section;

Fig. 6 is an enlarged central transverse section, certain parts being shown in elevation.

On one end of a strutted metal framing 10 is mounted by known means a front steering ground wheel 11 provided with a steering column 12 and with handle bars 13. A rear driving ground wheel 14 is adjustably mounted on the opposite end of the framing which is also fitted with a swinging bracket 15 to support the vehicle when not in use.

A spring returned hub brake 16 is adapted to be operated by means of a foot pedal 17 mounted on the framing 10.

A vertically oscillatable rocker frame 19 is pivoted on the framing 10 which also carries a gear assembly by which the downward movements of each end of the rocker frame are converted into forward travel of the vehicle, by means of a sprocket wheel 20, endless chain 21, and a rear sprocket 22 on the driving wheel 14.

A front foot-pedal 23 and a rear foot-pedal 24, each fitted with a shock absorbing spring 25, are pivoted on the rocker frame the pivoting of these pedals being so arranged as to give ease of movement of the feet of the user and not to effect forward drive, the latter effect is produced by the downward bodily movement of each pedal as a whole and of its support.

The gear assembly to convert oscillations of the rocker frame into forward drive of the vehicle comprises, as shown in Figs. 1, 2, and 3, a rotatable shaft 26 on which the sprocket wheel 20 is fast, a pinion wheel 27 fast on the shaft, a gear wheel 28 loose on the shaft 26 and in mesh with a rack bar 29 on the rocker frame, and a sliding clutch 30 adapted to hold gear 28 in clutch with pinion 27 when the front pedal 23 is descending and the rocker frame is swinging to the rear about its pivot 31, and to de-clutch gear 28 from pinion 27 when the front pedal is rising and the rocker frame is swinging towards the front.

Downward pressure by the user on foot-pedal 23 effects rearward swinging of the rocker frame and of the rack bar 29 so that gear 28 is rotated in anti-clockwise direction, and, by aid of clutch 30 effects anti-clockwise rotation of the pinion 27, shaft 26, and sprocket wheel 20.

To make use of downward pressure by the user on the rear foot-pedal 24 the gear assembly is provided with a shaft 32 parallel to shaft 26 and also rotatable in the framing 10. This shaft 32 is fitted with a gear wheel 33 loose on the shaft and in mesh with the rack bar 29 but not in mesh with gear 28, and with a pinion 34 fast on the shaft and in mesh with pinion 27. A sliding clutch 35, acting in the reverse direction to that of clutch 30, serves to hold gear 33 in clutch with pinion 34 when the rocker frame is swinging forwardly, and to de-clutch gear 33 from pinion 34 when the rocker frame is swinging rearwardly.

Downward travel of the rear foot-pedal 24 effects forward swing of the rocker frame and clockwise rotation of gear 33 and of pinion 34. The pinion 27, shaft 26, and sprocket wheel 20 are, in consequence, thereby rotated in anti-clockwise direction.

The hubs of gears 28 and 33 are channeled to house a lever 36 which is centrally pivoted to a horizontal steel arm 37. This arm is slidable in a housing in part of the framing and at its outer end has a bevelled face 38 which, normally, is in contact with the bevelled lower end of a spring-pressed pin 39. The pin 39 is housed in a central portion of a supporting bracket 40 and is held in contact with a boss 41 on the rocker frame 19. The boss is extended to form two separate cam faces 41A, 41B.

When the rack bar is about to reach the limit of its rearward or forward travel face 41A, or face 41B as the case may be, makes contact with the head of the pin 39. Further downward pressure by the associated actuating foot of the user effects downward movement of the pin 39 and, simultaneously, sliding movement of the arm 37 and of the lever 36 with the result that the gears 28 and 33 are de-clutched and the vehicle may be free-wheeled.

When cam face 41A or cam face 41B is moved off the head of pin 39 by exerting pressure on the other foot pedal the pin 39 is raised by its spring 39A and the clutches are returned to normal operative position by means of the associated springs 28A and 33A.

As shown in Fig. 5 the rocker frame 19 is fitted with two rack bars 42, 43. The shaft 26 carrying the sprocket wheel 29 is fitted with a loose gear wheel 44 which meshes with rack bar 42. A gear wheel 45 fast on the parallel shaft 32 meshes with rack bar 43 and with a pinion 46 loose on shaft 26.

A collar 47 fast on shaft 26 is fitted on each face with a clutch, one clutch 48 serving to clutch pinion 46 to shaft 26 only when it is rotated in anti-clockwise direction by gear 45. The clutch on the other face of collar 47 serves to clutch gear 44 to the shaft 26 when the gear wheel is rotated in anti-clockwise direction, and to de-clutch when gear 44 is rotated in the reverse direction. This form of the invention may also be fitted with the free-wheeling mechanism shown in Figs. 3 and 4.

I claim:

1. A foot-propelled vehicle comprising a steering ground wheel and a driving ground wheel mounted on opposite ends of a framing, a vertically oscillatable rocker frame pivoted on the framing and fitted with a foot-pedal at each of its ends, and a driving gear assembly carried by the framing and adapted to be driven to effect forward movement of the vehicle by downward travel only of each foot-pedal.

2. A foot-propelled vehicle comprising a steering ground wheel and a driving ground wheel mounted on opposite ends of a framing, a vertically oscillatable rocker frame pivoted on the framing and provided with a foot-pedal at each of its ends, a rack bar on the rocker frame, and a driving gear assembly in mesh with the rack bar and adapted to effect forward drive of the vehicle on downward travel only of either foot-pedal.

3. A foot-propelled vehicle comprising a steering ground wheel and a driving ground wheel mounted on opposite ends of a framing, a vertically oscillatable rocker frame pivoted on the framing, a pivoted foot-pedal on each end of the rocker frame, a shock absorbing spring between each pedal and the rocker frame, a rack bar on the rocker frame, and a driving gear assembly in mesh with the rack bar and adapted to effect forward drive of the vehicle on downward travel only of each pedal in alternate order.

4. A foot-propelled vehicle comprising a steering ground wheel and a driving ground wheel mounted on opposite ends of a framing, a vertically oscillatable rocker frame pivoted on the framing, a pivoted foot-pedal on each end of the rocker frame, and a driving gear assembly connected with said driving ground wheel and adapted to convert downward travel only of each end of the rocker frame into forward travel of the vehicle.

5. A foot-propelled vehicle comprising a steering ground wheel and a driving ground wheel mounted on opposite ends of a framing, a vertically oscillatable rocker frame pivoted on the framing, a rack bar on the rocker frame, a gear assembly in mesh with the rack bar and adapted to effect forward drive of the driving ground wheel on the downward travel only of either end of the rocker frame, and cam faces on the rocker frame adapted in turn to de-clutch the gear assembly on further downward movement of either end of the rocker frame.

6. A foot-propelled vehicle comprising a steering ground wheel and a driving ground wheel mounted on the opposite ends of a framing, a pivoted foot-pedal on each end of a vertically oscillatable rocker frame pivoted on the framing, a rack bar on the rocker frame, a gear assembly in mesh with the rack bar and adapted to effect forward drive of the driving ground wheel on downward travel only of either foot-pedal, and spaced cams on the rocker frame adapted to de-clutch the gear assembly on further downward travel of either foot-pedal.

7. A foot-propelled vehicle comprising a steering ground wheel and a driving ground wheel mounted on a framing, a vertically oscillatable rocker frame pivoted on the framing, a rack bar on the rocker frame, a gear assembly in mesh with the rack bar and adapted to effect forward drive of the driving ground wheel on downward travel only of either end of the rocker frame and comprising a pair of parallel shafts rotatable in the framing, an independent gear wheel loose on each of the shafts and in mesh with the rack bar, a clutch on each gear wheel and adapted to operate reversely to each other, a pinion wheel fast on each shaft and in mesh with each other and a driving sprocket wheel fast on one of said shafts and chain connected with the said driving ground wheel.

8. A foot-propelled vehicle comprising a steering ground wheel and a driving ground wheel mounted on a framing, a vertically oscillatable rocker frame pivoted on the framing, a rack bar on the rocker frame, a gear assembly in mesh with the rack bar and adapted to effect forward drive of the driving ground wheel on the downward travel only of the front end of the rocker frame and comprising a rotatable shaft, a sprocket wheel fast on the rotatable shaft and chain connected with the driving ground wheel, a gear wheel loose on the other end of the shaft and in mesh with the rack bar, a pinion wheel fast on the rotatable shaft, and a sliding clutch on the gear wheel adapted to clutch the said gear wheel to said pinion wheel during anti-clockwise rotation of said gear wheel by the downward travel of the front end of the rocker frame, and to de-clutch the said gear wheel from the said pinion wheel on clockwise rotation of the said gear wheel by the rack bar, and spring means for returning said clutch into operative position.

9. A foot-propelled vehicle comprising a steering ground wheel and a driving ground wheel mounted on the opposite ends of a framing, a vertically oscillatable rocker frame pivoted on the framing, a rack bar on the rocker frame, a gear assembly in mesh with the rack bar and adapted to effect forward drive of the driving wheel on downward travel of the rear end of the rocker frame and comprising a pair of parallel shafts rotatable in the framing, a sprocket wheel fast on one of said shafts and chain connected with the driving ground wheel, a pinion fast on the said shaft, a gear wheel loose on the other shaft, a pinion fast on said other shaft and in mesh with the pinion on the sprocket-carrying shaft, a sliding clutch on said loose gear wheel and adapted to clutch said gear wheel to the pinion fast on its shaft during the downward travel of the rear end of the rocker frame and to de-clutch said gear wheel during the upward travel of the rear end of the rocker frame, and spring means for returning the clutch into operative position.

10. A foot-propelled vehicle comprising a steering ground wheel and a driving ground wheel mounted on a framing, a vertically oscillatable rocker frame pivoted on the framing and adapted to be oscillated by downward travel of each foot of the user in alternate order, a gear assembly adapted to effect forward drive of the driving ground wheel on downward travel only of either end of the rocker frame, gear wheels of the gear assembly adapted to be rotated by the travel of the rocker frame, a lever housed in the hubs of said gear wheels, a bevelled ended arm horizontally slidable in a housing on the framing and carrying said lever, a bevelled ended spring-pressed pin in contact with the bevelled end of the slidable arm, and cam faces carried by the rocker frame adapted to slide said slidable arm when either end of the rocker frame reaches the limit of its travel and to de-clutch said gear wheels.

11. A foot-propelled vehicle comprising a front steering ground wheel and a rear driving ground wheel mounted on a framing, a vertically oscillatable rocker frame pivoted on the framing, a foot-pedal pivoted on each end of the rocker frame and provided with a shock absorbing spring, a rack bar on the rocker frame, a gear assembly co-operating with the rocker frame and adapted to effect forward drive of the driving ground wheel on downward travel only of each foot-pedal, gear wheels of the gear assembly in mesh with the rack bar, a spring-pressed clutch on each of said gear wheels and adapted to operate in reverse direction to each other, a lever housed in the hubs of the gear wheels, a horizontally slidable arm carrying the lever, a spring-pressed pin adapted to co-operate with said arm, and cam faces on said rocker arm adapted to depress said pin on the limit of the downward travel of either end of the rocker arm and to de-clutch said gear wheels.

CRESWELL SMITH.